United States Patent [19]

Sakaguchi et al.

[11] Patent Number: 5,417,839
[45] Date of Patent: May 23, 1995

[54] METHOD FOR MANUFACTURING ALUMINUM FOILS USED AS ELECTROLYTIC CAPACITOR ELECTRODES

[75] Inventors: Masashi Sakaguchi; Tadao Fujihira; Kiyoshi Tada, all of Osaka; Hisatsugu Nakaya, Oyamashi; Shozo Umetsu; Takashi Tamura, both of Osaka, all of Japan

[73] Assignee: Showa Aluminum Corporation, Osaka, Japan

[21] Appl. No.: 287,837

[22] Filed: Aug. 9, 1994

Related U.S. Application Data

[63] Continuation of Ser. No. 606,505, Oct. 31, 1990, abandoned.

[51] Int. Cl.⁶ .............................................. C25D 11/04
[52] U.S. Cl. ...................................... 205/153; 205/201
[58] Field of Search ................................ 205/153, 201

[56] References Cited

U.S. PATENT DOCUMENTS

| | | | |
|---|---|---|---|
| 4,252,575 | 2/1981 | Barnard | 204/38.3 |
| 4,276,129 | 6/1981 | Kanzaki et al. | 204/58 |
| 4,470,885 | 9/1984 | Randall et al. | 204/58 |
| 4,969,974 | 11/1990 | Kunugihara et al. | 204/38.3 |

FOREIGN PATENT DOCUMENTS

| | | |
|---|---|---|
| 89795 | 5/1984 | Japan. |
| 273308 | 11/1989 | Japan. |
| 273309 | 11/1989 | Japan. |
| 146718 | 6/1990 | Japan. |
| 262318 | 10/1990 | Japan. |

OTHER PUBLICATIONS

MPEP 715, pp. 78–80.

Primary Examiner—John Niebling
Assistant Examiner—Kishor Mayekar

[57] ABSTRACT

Aluminum foils used as a material of electrodes in electrolytic capacitors are manufactured by a method which comprises a step of forming at first an initial internal oxide coating 5 to 50 Å thick on the surface of the aluminum foils before they are electrochemically or chemically etched later. The aluminum foils are then subjected to high temperature heat treatment such that the whole thickness of the oxide coating does not exceed 70 Å.

4 Claims, 1 Drawing Sheet

METHOD FOR MANUFACTURING ALUMINUM FOILS USED AS ELECTROLYTIC CAPACITOR ELECTRODES

This application is a continuation of application Ser. No. 606,505, filed Oct. 31, 1990, now abandoned.

BACKGROUND OF THE INVENTION

1. Field of the Invention

The invention relates to a method for manufacturing aluminum foils which are used as electrodes in electrolytic capacitors or condensers. The word "aluminum" in this specification defines and includes aluminum and its alloys.

2. Description of Prior Art

Aluminum foils are generally used as the electrodes in electrolytic capacitors, and before incorporated therein, subjected to chemical or electrochemical etching treatment in order to increase their effective surface and their capacitance per unit surface area. Simple etching treatment however cannot provide such foils with satisfactory capacitance.

High temperature heat treatment has widely been employed to be carried out at a temperature of about 500° C. or higher during final annealing process after foil rolling process, so that "cluster texture" rich in "cubic azimuth" might be enhanced to the foils thereby improving their etching property. This method has also proved insufficient to meet the recent needs and demands for higher capacitance of electrolytic capacitors.

The present applicant proposed, as disclosed on the Japanese Patent Publication 58-34925, an aluminum material for electrolytic capacitors which material comprised an aluminum foil covered with a crystalline $\gamma$-$Al_2O_3$ coating of a given thickness and was improved in its etching property. The material were to be produced by forming at first a hydrated coating on the surface of aluminum foil. Subsequently, the aluminum foil covered with the hydrate coating was heated in non-oxidizing atmosphere at 500° to 600° C. for 2 to 10 hours. Said hydrate coating was thus converted to a crystalline $\gamma$-$Al_2O_3$ layer of 40 to 200 Å in thickness.

This method has however not increased capacitance to a sufficient degree.

OBJECTS AND SUMMARY OF THE INVENTION

Therefore, an object of the invention is to provide a method for manufacturing aluminum foils which are used as electrolytic capacitor electrodes, are excellent in their etching property, and are of a high capacitance.

Another object of the invention is to provide a method for manufacturing aluminum foils used as electrolytic capacitor electrodes, in which method high capacitance is enhanced without failure to the aluminum foils in a stable manner without any significant variation between individual capacitance values.

The inventors have conducted various studies in order to accomplish these objects and have found the whole thickness of an internal and external oxide layers or coatings to be a very important factor with respect to the objects of the invention, said internal coating being formed on the surface of an aluminum foil during final annealing treatment thereof. More in detail, the inventors became cognizant of a fact that if the internal oxide coating of a controlled thickness is formed during an initial stage of annealing treatment before a succeeding high temperature heat treatment, a number of etching nuclei are generated on said surface. The nuclei correspond to such cells or subgrains as existing at the initial stage on the surface of said foil, and do function as nuclei for producing etching pits. Another fact has also been found by the inventors that an additional or external oxide coating should be as thin as possible, this coating being additionally produced on the surface of the internal oxide coating during the high temperature heat treatment. This novel knowledge has led to the present invention.

The abovementioned objects are accomplished in the invention by employing a method for manufacturing aluminum foils used as a material of electrodes in electrolytic capacitors, the method comprising a first step of forming an internal oxide coating 5 to 50 Å thick on the surface of an aluminum foil before electrochemical or chemical etching treatment thereof, and a second step of conducting a high temperature heat treatment of the aluminum foil to form an external oxide coating on the surface of the internal oxide coating which has been produced during the first step wherein the whole thickness of the oxide coatings is controlled to be 70 Å or less.

DETAILED DESCRIPTION OF THE INVENTION

Aluminum foils used in the invention are desirably formed from an aluminum of purity of 99.99% or higher, however, the purity is not restricted thereto but may be that which falls within a range suited as a material for the electrolytic capacitors.

Initial or internal oxide coating which is formed on the surface of aluminum foil during an annealing process after foil-rolling must be of a thickness from 5 to 50 Å, because this thickness is deemed effective to produce etching nuclei formed of "membrane faults" in the surface layer and corresponding to distribution of cells or subgrains on the surface of the foil. The thickness less than 5 Å is likely to prevent the forming of etching nuclei. On the other hand, the thickness greater than 50 Å will cause the produced etching nuclei to be lost. The most preferable range of thickness is from 15 to 45 Å. Such a coating of 5 to 50 Å in thickness and having the etching nuclei may be formed according to the invention in the following manner.

Figure 1:
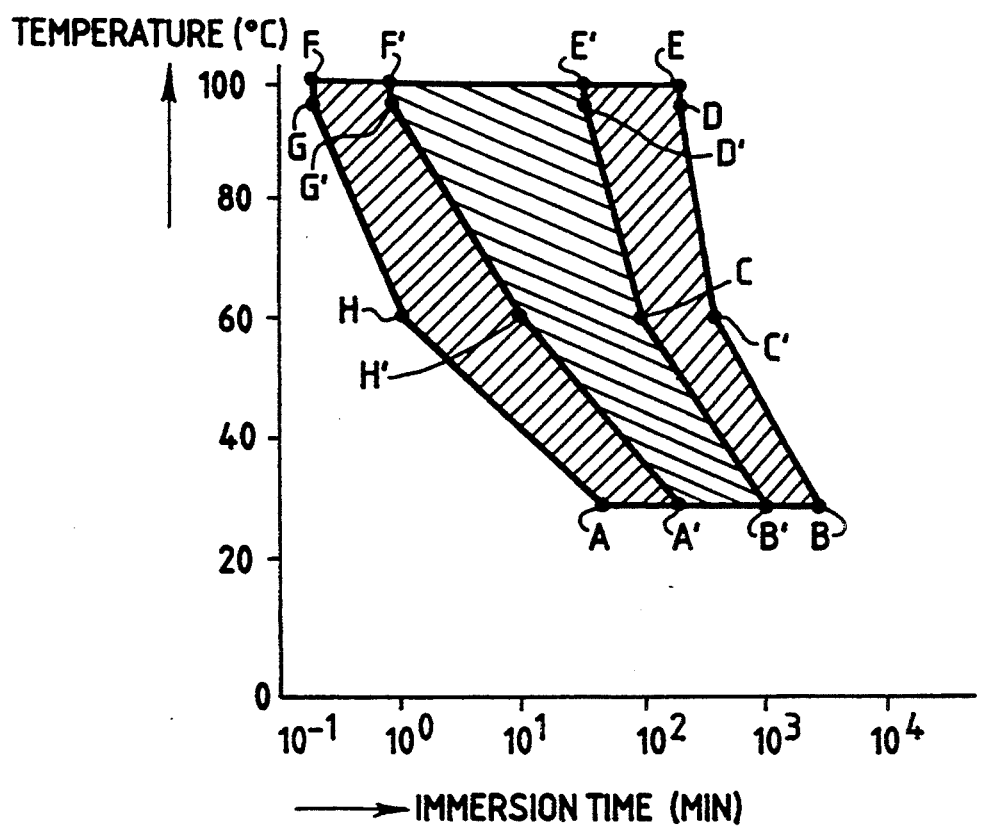
FIG. 1 is a graph showing a relationship between immersion time and temperature in a water-immersion heating method conducted as a first step of forming an internal oxide coating.

For example, an aluminum foil made by the rolling process may be immersed in water on a condition of water temperature and duration of immersion, which condition is to be included in such a polygonal area as shown in FIG. 1 and enclosed with a series of point "A" (30° C., 60 min), point "B" (30° C., 4,500 min), point "C" (60° C., 500 min), point "D" (95° C., 200 min), point "E" (100° C., 200 min), point "F" (100° C., 0.2 min), point "G" (95° C., 0.2 min), and point "H" (60° C., 1 min). This condition of water temperature and immersion time will give rise, without failure, to a hydrated layer as the oxide coating. In other words, any other condition not included in the polygonal area cannot provide the oxide coating of a desirable thickness. The most desirable range of the immersion condition is given as another polygonal area defined by another series of the following points: i.e., A' (30° C., 200 min), B' (30° C., 1,000 min), C' (60° C., 100 min), D' (95° C., 60 min), E' (100° C., 60 min), F' (100° C., 1 min), G' (95° C., 1 min), and H' (60° C., 10 min).

Alternatively, another procedure may be employed in the invention in place of the abovementioned procedure in order to produce the initial or internal oxide coating of 5 to 50 Å in thickness, wherein the rolled aluminum foils are processed in a low temperature heat treatment within an atmosphere of air or argon gas (Ar) which contains water vapor or oxygen gas. A desirable condition of the treatment can be provided by adopting: heating temperature of 40° to 200° C.; duration of heating of 10 minutes to 24 hours; atmosphere pressure of 2 atms or higher; and content of water vapor ($H_2O$) being 0.01 kg/Kg or more. Such a range of heating temperature of 40° to 200° C. is important because the oxide coating is hardly formed at a lower heating temperature below 40° C., while the resulting capacitance of the foil is not increased if the foil is treated at a temperature above 200° C. Though the oxide coating will be formed in general more quickly at higher temperatures, such an extremely quick formation of the coating will so undesirably increase the size of cells or subgrains that the number of etching pits is reduced to lower said capacitance. The most desirable heating temperature is from 60° to 150° C. In connection with the heating duration from 10 minutes to 24 hours, it is to be noted that a period shorter than 10 minutes is too short to provide the oxide coating of an acceptable thickness. Heating for longer than 24 hours will however give no additional thickness to the coating, but merely resulting in waste of heating energy and thereby raising manufacture cost. The most desirable duration of heating is from 30 minutes to 24 hours. Further, the pressure of heating atmosphere is to be set at 2 atms or higher as mentioned above in view of a fact that an atmosphere pressure below 2 atms reduces the rate of oxide coating formation and the coating thickness thereby failing to enhance high capacitance to the foils in the event that the heating temperature were not set at a sufficiently high level. It is difficult for a practical equipment to keep its internal pressure higher than 10 atms, although a higher pressure is more desirable for the purpose of quicker formation of the oxide coating. Thus, the pressure from 2 to 10 atms is recommended for commercial manufacture equipments. If $H_2O$ content of the heating atmosphere is less than 0.01 Kg/Kg, the oxide coating of a sufficient thickness is hardly obtained. Therefore, $H_2O$ content of 0.01 Kg/Kg, or more desirably 0.02 Kg/Kg or higher is preferred so that the oxide coating of a sufficient thickness is produced rapidly. Low temperature heat treatment described above may either be carried out through a simple stage or through two successive stages with different conditions as to the heating temperature, duration of heating, or other factors.

A first step which is as described above conducted to form the initial or internal oxide coating is to be started while an average size of cells or subgrains in the surface layer of aluminum foil is still 10 μm or less. This condition is important because it seems that, when the aluminum foils are etched, respective etching pits are produced corresponding to respective cells or subgrains which exist at an early stage of annealing process. With such an average size of cells or subgrains not exceeding 10 μm at start of the first step, there exist many cells which increase effective surface area of the foils so as to enhance a high capacitance thereto. Thus, the average size which can be controlled by means of the condition of cold rolling of aluminum foils is more preferably to be 5 μm or less.

It is also desirable that the initial oxide coating is formed as uniform as possible over the whole surface of each raw foil, in order to assure a highest possible capacitance. Therefore, it is recommended to remove, before forming the oxide coating, an outermost surface portion from each raw foil made by the rolling method. This outermost portion to be removed is generally contaminated with oils and comprises a thin inhomogeneous oxide layer which are produced during the rolling process. Furthermore, a "subcutaneous" portion adjacent to and under the outermost portion includes an inhomogeneously deteriorated layer and a contaminated layer which are produced by the rolling process and the roll-coating step thereof, respectively. These inhomogeneous outermost and subcutaneous portions will prejudice uniformity in the subsequently formed oxide coating in the invention. It will now be apparent that said inhomogeneous portions should be previously removed prior to the step conducted in the invention so as to form the oxide coating in a controlled manner. Any suitable method may be employed here to remove such inhomogeneous surface portions. Examples of employable methods include the wet etching methods such as alkali etching and acid etching and the dry etching methods such as ion-beam etching. Removal of the surface inhomogeneous portions is to be carried out to a depth of 5 Å or more, and more desirably to a depth of 20 Å or more from the surface of foils, in order to ensure such an intentional effect as mentioned above. However, removal of said portions to a depth greater than 500 Å will be useless giving no further effect.

A second step of high temperature heat treatment is performed after the first step has been conducted to form the initial or internal oxide coating of 5 to 50 Å in thickness. This second step is effective to enhance to aluminum foils a cluster texture rich in cubic azimuths which improve the etching property of the foils. An external or additional oxide coating is superposingly formed on the initial or internal oxide coating which has been formed at the first step. If the external oxide coating is made too thick, then the etching nuclei which are the faults found in the internal oxide coating will disappear to disable a sufficient number of etching pits from being produced when the etching process is done. The high temperature heat treatment at the second step is preferably conducted to suppress to or below 70 Å the whole thickness of internal and external oxide coatings. The whole thickness of or below 50 Å is more desirable. The aluminum foils are to be heated within a non-oxidizing atmosphere from which water vapor and oxygen gas have been removed almost completely so that said whole thickness may be kept at or below 70 Å. In detail, an inert gas such as argon gas or an evacuated atmosphere of or below $10^{-3}$ Torrs may be employed as the atmosphere for the second step, which may be carried out at about 460° to about 550° C. for 1 to 24 hours.

The aluminum foils which have undergone the first and second steps will subsequently be subjected to electrochemical or chemical etching process to provide a material constituting electrolytic capacitors. During the etching process, the etching nuclei and portions adjacent thereto in the oxide coatings are concentratedly etched. Owing to the foil texture having the etching property improved during the high temperature heat treatment, there will be generated deep and big etching pits.

The raw aluminum foils used in the invention may be manufactured by any known method, and may be those which have been subjected to the "process annealing" during the rolling process.

The thickness of oxide coatings in this specification may be determined by means of Hunter-Hall method which will be described below in the section of EMBODIMENTS.

As will be apparent from the description made hereinbefore, the method according to the invention provides surely and stably the aluminum foils which can be etched to produce many etching pits to increase their effective or functional areas, whereby high capacitance is enhanced to the electrolytic capacitors whose electrodes may be formed of the thus etched aluminum foils.

THE PREFERRED EMBODIMENTS

# First Embodiment

An aluminum metal having a purity of 99.99% was used to prepare raw aluminum foils 100 μm in thickness. In the rolling process of the foils, its conditions were selected to give such average sizes of cells or subgrains as listed on Table 1.

Next, some kinds of the raw aluminum foils were immersed in 0.01% NaOH solution at 30° C. for varied periods of time, in order to remove surface portions amounting to the quantities listed on Table 1.

Subsequently, initial or internal oxide coatings of varied thickness were formed on the surface of said foils, under varied conditions of low temperature heat treatment as shown in Table 1. The thickness of said foils was measured in accordance with the Hunter-Hall method on the following conditions:

Bath: 30 g/l aqueous solution of ammonium tartrate,
Temperature of bath: 30° C.,
Opposite electrode: carbon,
Measuring electrode: samples to be measured, and
Charging rate of direct-current voltage: 5 V/sec.

TABLE 1

| Samples | Removal of surface Time (sec) | Removal of surface Thick. (Å) | Ave. size (μm) of cells or subgrains Before L.H.T. | Ave. size (μm) of cells or subgrains After L.H.T. | Conditions of "low temp. heat treatment" Environ. | Conditions of "low temp. heat treatment" Pressure (atm) | Conditions of "low temp. heat treatment" Temp. (°C.) | Conditions of "low temp. heat treatment" Time (hrs.) | Conditions of "low temp. heat treatment" $H_2O$ (Kg/Kg) | Oxide coating (Å) Init. After L.H.T. | Oxide coating (Å) Whole. After H.H.T. | Capacitance (C.V.) |
|---|---|---|---|---|---|---|---|---|---|---|---|---|
| Reference |
| 1 | 5 | 20 | 4 | 4 | air | 2 | 20 | 0.3 | 0.004 | 3 | 37 | 168 |
| Invention |
| 2 | 5 | 20 | 4 | 6 | air | 2 | 70 | 20 | 0.015 | 28 | 43 | 246 |
| 3 | 15 | 63 | 4 | 6 | air | 2 | 70 | 20 | 0.015 | 28 | 43 | 262 |
| 4 | 60 | 247 | 4 | 6 | air | 2 | 70 | 20 | 0.015 | 28 | 43 | 268 |
| 5 | 120 | 503 | 4 | 6 | air | 2 | 70 | 20 | 0.015 | 28 | 43 | 265 |
| 6 | 200 | 821 | 4 | 6 | air | 2 | 70 | 20 | 0.015 | 28 | 43 | 261 |
| 7 | unremoved | | 4 | 5 | air | 2 | 70 | 20 | 0.030 | 30 | 43 | 245 |
| 8 | unremoved | | 4 | 9 | air | 1 | 170 | 5 | 0.015 | 38 | 46 | 220 |
| 9 | unremoved | | 3 | 6 | air | 3 | 100 | 5 | 0.030 | 33 | 43 | 262 |
| 10 | unremoved | | 3 | 6 | water | — | 60 | 1.3 | — | 25 | 41 | 264 |
| 11 | 15 | 63 | 4 | 6 | water | — | 90 | 0.5 | — | 20 | 48 | 235 |
| Reference |
| 12 | 60 | 247 | 4 | 12 | air | 1 | 230 | 20 | 0.030 | 56 | 59 | 179 |
| 13 | unremoved | | 4 | 10 | air | 1 | 200 | 20 | 0.030 | 54 | 60 | 180 |

Notes:
"Thick." = Thickness,
"Ave." = Average,
"Environ." = Environment,
"Temp." = Temperature,
"Init." = Thickness of initial (internal) coating,
"Whole." = Whole thickness of internal and external oxide coatings,
"L.H.T." = Low temperature heat treatment,
"H.H.T." = High temperature heat treatment,
"C.V." = (Capacitance) × (Voltage), and
"Thickness of removed surface portion (Å)" = Dissolved quantity (g)/[Surface area (cm$^2$) × Aluminum density (i.e., 2.71 g/cm$^3$)]

Figure 2:
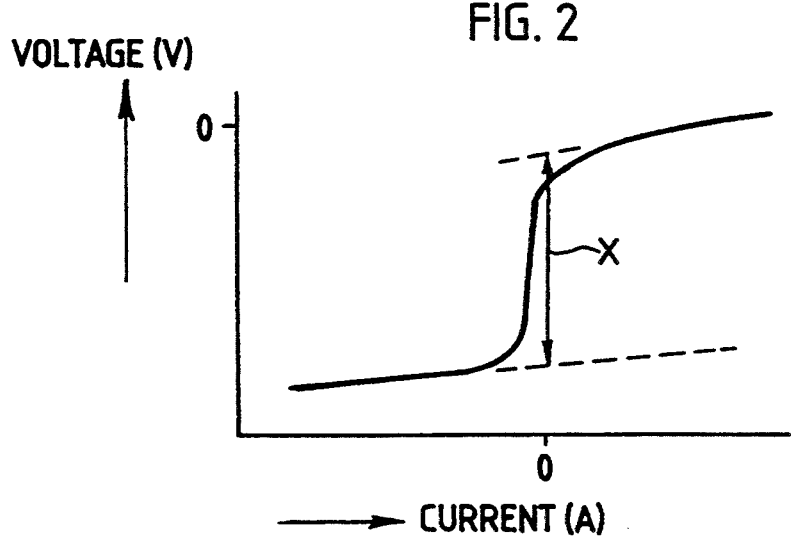
FIG. 2 is a graph showing a relationship between current and voltage, the relationship illustrating the Hunter-Hall method adopted to determine thickness of oxide coatings in an embodiment.

Under these conditions, voltage was charged to each test piece of aluminum foil whose capacitance was to be determined, thereby giving a characteristic current-voltage curve shown in FIG. 2. Then, voltage difference χ was measured as illustrated in FIG. 2 and used to calculate 'thickness of oxide coating' ("Thickness") by the following equation:

Thickness = χ × 14 Å/V

Average sizes of cells or subgrains of the aluminum foils were also measured before and after the low temperature heat treatment for each test piece, whereby differences as listed on Table 1 were determined.

Subsequently, each test piece of aluminum foil was subjected to the high temperature heat treatment which was carried out at 520° C. for 1 hour within an atmosphere evacuated to $10^{-4}$ Torr. Total thickness of the oxide coatings on the foil surfaces was measured also by the Hunter-Hall method in the same manner as described above, and results obtained are listed on Table 1.

Next, electrolytic etching of the heat-treated samples was executed at 85° C. for 3 minutes in 3% HCl solution, with a current density of 10 A/dm$^2$. Thereafter, chemical etching of the samples was done for 10 minutes in the same solution. Finally, the samples were put in a 5% boric acid solution for the purpose of chemical treatment at 350 V, and their capacitance was determined to give such data as listed also on Table 1.

# Second Embodiment

An aluminum metal having a purity of 99.99% was used to prepare raw aluminum foils which were 100 μm in thickness and had an average size 4 μm of cells or subgrains. The raw aluminum foils were immersed in 0.01% NaOH solution at 30° C. for 60 seconds, in order to remove surface portions of an average removed thickness of 247 Å.

Subsequently, initial or internal oxide coatings 32 Å in thickness were formed on the surface of said foils, by heating them at 100° C. for 10 hours in an atmosphere containing $H_2O$ at concentration of 0.015 Kg/Kg. Average sizes of cells or subgrains on the surface of the foils were 7 μm after this low temperature heat treatment for each test piece, wherein said average size remained to be or less than 10 μm during this treatment.

Subsequently, each test piece of aluminum foil was subjected to the high temperature heat treatment which was carried out at 520° C. for 1 hour within atmospheres evacuated differently to $10^{-1}$ to $10^{-5}$ Torr. Total thickness of the oxide coatings on the foil surfaces was measured by the Hunter-Hall method, and results obtained thereby are such as listed on Table 2.

Next, etching and chemical treatment of the heat-treated samples was executed under the same conditions as in the first embodiment, and their capacitance was determined to give such data as listed also on Table 2.

TABLE 2

| Samples | Whole thickness of oxide coatings (Å) | Capacitance (C.V.) |
| --- | --- | --- |
| Invention | | |
| 14 | 43 | 268 |
| 15 | 51 | 231 |
| 16 | 68 | 209 |
| Reference | | |
| 17 | 79 | 182 |

As seen from Tables 1 and 2, the samples according to the invention are formed with higher density of many etching pits which ensure higher capacitance.

What is claimed is:

1. A method for manufacturing aluminum foils used as a material of electrodes in electrolytic capacitors, the method comprising:

a first step of forming an initial internal oxide coating 5 to 50 Å thick on a surface of an aluminum foil before electrochemical or chemical etching treatment thereof; and a second step of conducting a high temperature heat treatment of the aluminum foils to form an external oxide coating on the surface of the internal oxide coating which has been produced at the first step, wherein the whole thickness of the oxide coatings is controlled not to exceed 70 Å.

2. The method of claim 1 wherein the internal oxide coating is 15 to 45 Å in thickness.

3. The method of claim 1 wherein the whole thickness of oxide coatings is 50 Å or less.

4. The method of claim 1 wherein the initial internal oxide coating is formed while an average size of cells or subgrains is still 10 μm or less.

* * * * *